UNITED STATES PATENT OFFICE.

MELCHIOR BÖNIGER, OF BASEL, SWITZERLAND, ASSIGNOR TO CORPORATION OF CHEMICAL WORKS FORMERLY SANDOZ, OF BASEL, SWITZERLAND.

AZO DYE AND PROCESS OF MAKING SAME.

No. 841,371.      Specification of Letters Patent.      Patented Jan. 15, 1907.

Application filed April 12, 1906. Serial No. 311,263.

*To all whom it may concern:*

Be it known that I, MELCHIOR BÖNIGER, doctor of philosophy, chemist, and a resident of 60 Fabrikstrasse, Basel, Switzerland, have invented new and useful Improvements in the Manufacture of New Monoazo Dyes, of which the following is a specification.

This invention relates to the manufacture of new monoazo dyes suitable for subsequent chroming or treatment with bluestone by the action of orthodiazophenol compounds on aryl 1.8 naphthylamin sulfonic acids. The direct dyeings of these dyestuffs on wool in an acid-bath vary from blue-red to dark violet and are transformed by subsequent treatment with bichromate or blue-stone into very valuable dark blue, blue-black, and deep-black shades of excellent fastness to light and milling. The best results have been obtained by employing for the combination with aryl 1.8 naphthylamin sulfonic acids the diazo compounds of mono- and dichloro-ortho-amidophenol, mono- and dinitro-orthoamidophenols, chloro-nitro-ortho-amidophenols, nitro-ortho-amido-cresols, ortho-amidophenol sulfonic acids, their homologues and substitution products.

The following examples will serve to illustrate this invention and how it may be performed. The parts are by weight:

First. Dissolve 15.4 parts of paranitro-orthoamidophenol in two hundred parts of water and twelve parts of hydrochloric acid of 21° Baumé and diazotize this solution after cooling to 0° centigrade by addition of seven parts of sodium nitrite. Introduce the diazo compound thus obtained in form of a yellowish crystalline powder into a neutral solution of thirty-four parts phenyl-1.8 naphthylamin sulfonate of soda in four hundred parts of water. After stirring for about forty-eight hours the reaction is complete, six parts of Solvay soda being then added and the dyestuff precipitated with common salt, filtered off, and dried. It dissolves in water and ethylic alcohol with Bordeaux-red color, in strong sulfuric acid with dark-violet color. On addition of acids to the aqueous solution the dyestuff is precipitated in violet-blue flakes. It dyes wool brown-violet in an acid-bath. By subsequent chroming a very valuable black with blue reflection and of excellent fastness to light, acids, alkalies, and milling is obtained.

Second. The diazo compound from 22.5 parts of 4-chloro-2 amidophenol 6 sulfonic acid, reacting but slightly acid on Congo paper, is mixed with the solution of thirty-six parts of paratolyl 1.8 naphthylamin sulfonate of soda in four hundred parts of water. The reaction being complete after twenty-four hours stirring at ordinary temperature, six parts of Solvay soda are then added, whereupon the dyestuff is precipitated from the blue-red solution by common salt. It dyes wool direct from acid-baths in Bordeaux-red shades, which turn violet-blue on subsequent treatment with blue-stone and dark blue on subsequent treatment with bichromate. A similar dyestuff is obtained in using in the foregoing process the diazo compound of orthoamidoparacresol sulfonic acid.

The combination of all the different orthodiazophenol compounds with the aryl-1.8 naphthylamin sulfonic acids may be carried out in an analogous manner. Also sodium acetate or sodium bicarbonate or other salts having a weak alkaline reaction may be added to accelerate the copulation of the diazo body, or the dyestuff-sulfonic acid formed during the reaction may be gradually neutralized by alkalies in order to complete the reaction. The process, therefore, is not confined to the details of the specific foregoing examples.

The new orthohydroxyazo dyestuffs in the form of their sodium salts are dark powders of metallic luster dissolving in water and ethylic alcohol with blue-red to violet, in strong sulfuric acid with violet to blue color, depositing therefrom on dilution with water the dyestuff in form of violet to blue flakes. Upon reduction—as, for instance, with stannous chlorid and hydrochloric acid—they are split off in the corresponding orthoamidophenol compounds and aryl 1.4 naphthylenediamin 8 sulfonic acid. They dye unmordanted wool from an acid-bath in blue-red to violet shades, which turn into dark blue to black by subsequent chroming or treatment with blue-stone.

Now what I claim, and desire to secure by Letters Patent, is the following:

1. The herein-described process for the manufacture of monoazo dyes by combining orthodiazophenol compounds with aryl-1.8 naphthylamin sulfonic acids, substantially as described.

2. The herein-described new monoazo dyes obtainable by combining orthodiazophenol compounds with aryl-1.8 naphthylamin sulfonic acids, which dyestuffs are in the form of their alkaline salts dark powders with metallic luster, dissolving in water and ethylic alcohol with blue-red to violet, in strong sulfuric acid with violet to blue color, the dyestuffs being deposited from the latter solution on addition of water in violet to blue flakes; dyeing unmordanted wool blue-red to violet shades, which turn into dark blue to black by subsequent chroming or treatment with blue-stone; yielding upon reduction an orthoamidphenol compound and an aryl-1.4 naphthylenediamin 8 sulfonic acid, substantially as hereinbefore described.

In testimony that I claim the foregoing as my invention I have signed my name, in presence of two witnesses, this 29th day of March, 1906.

MELCHIOR BÖNIGER.

Witnesses:
GEO. GIFFORD,
WILHELM BÜNZ.